United States Patent [19]

Chou et al.

[11] Patent Number: 5,417,946

[45] Date of Patent: May 23, 1995

[54] PROCESS FOR REMOVING TOTAL REDUCED SULFUR COMPOUNDS FROM GASEOUS STREAM

[75] Inventors: Charles C. Chou; Chaoliang Yao, both of Houston, Tex.

[73] Assignee: Shell Oil Company, Houston, Tex.

[21] Appl. No.: 176,045

[22] Filed: Dec. 30, 1993

[51] Int. Cl.$^6$ .................. C01B 17/00; C01B 17/16
[52] U.S. Cl. .................. 423/210; 423/224; 423/225; 423/231; 423/242.1; 423/243.01; 423/243.07; 423/576.5
[58] Field of Search .......... 423/210, 242.1, 243.01, 423/243.07, 231, 225, 576.5, 576.6, 224

[56] References Cited

U.S. PATENT DOCUMENTS

| | | | |
|---|---|---|---|
| 3,793,171 | 2/1974 | Zabolotny et al. | 204/130 |
| 4,076,793 | 2/1978 | Nikolai | 423/242 |
| 4,235,853 | 11/1980 | Nikolai | 423/242 |
| 4,310,497 | 1/1982 | Deschamps et al. | 423/230 |
| 4,552,734 | 11/1985 | Iannicelli et al. | 423/230 |
| 4,552,735 | 11/1985 | Iannicelli et al. | 423/224 |
| 4,713,225 | 12/1987 | Iannicelli | 423/230 |
| 4,822,576 | 4/1989 | Chu | 423/228 |
| 4,824,645 | 4/1989 | Jones et al. | 423/226 |
| 4,880,609 | 11/1989 | Naraghi | 423/226 |
| 4,892,718 | 1/1990 | Peter et al. | 423/235 |
| 4,923,688 | 5/1990 | Iannicelli | 423/224 |
| 4,925,569 | 5/1990 | Chou et al. | 210/713 |
| 5,147,620 | 9/1992 | Rozsa | 423/224 |

FOREIGN PATENT DOCUMENTS

| | | | |
|---|---|---|---|
| 50-33974 | 4/1975 | Japan | 423/243.07 |
| 53-017567 | 2/1978 | Japan . | |
| 51136592 | 8/1980 | Japan . | |
| 1005850 | 3/1983 | U.S.S.R. | 423/225 |

Primary Examiner—Wayne A. Langel
Assistant Examiner—Timothy C. Vanoy
Attorney, Agent, or Firm—Y. Grace Tsang

[57] ABSTRACT

A process for removing Total Reduced Sulfur compounds from a gaseous stream such as those containing natural gas, industrial gas, and digester gas by oxidation with a fine flocculent acidic catalyst slurry which is regenerable during the process by pH adjustment in the absence of added heat. The catalyst slurry comprises $MnO_2$, $Mn_2O_3$, and $Mn_3O_4$ having pH in the range from about 0.5 to about 6.5 and is prepared by oxidizing a divalent manganous salt in an aqueous solution having a pH in the range from about 8.0 to about 13.5 with an oxygen-containing gaseous stream.

8 Claims, 1 Drawing Sheet

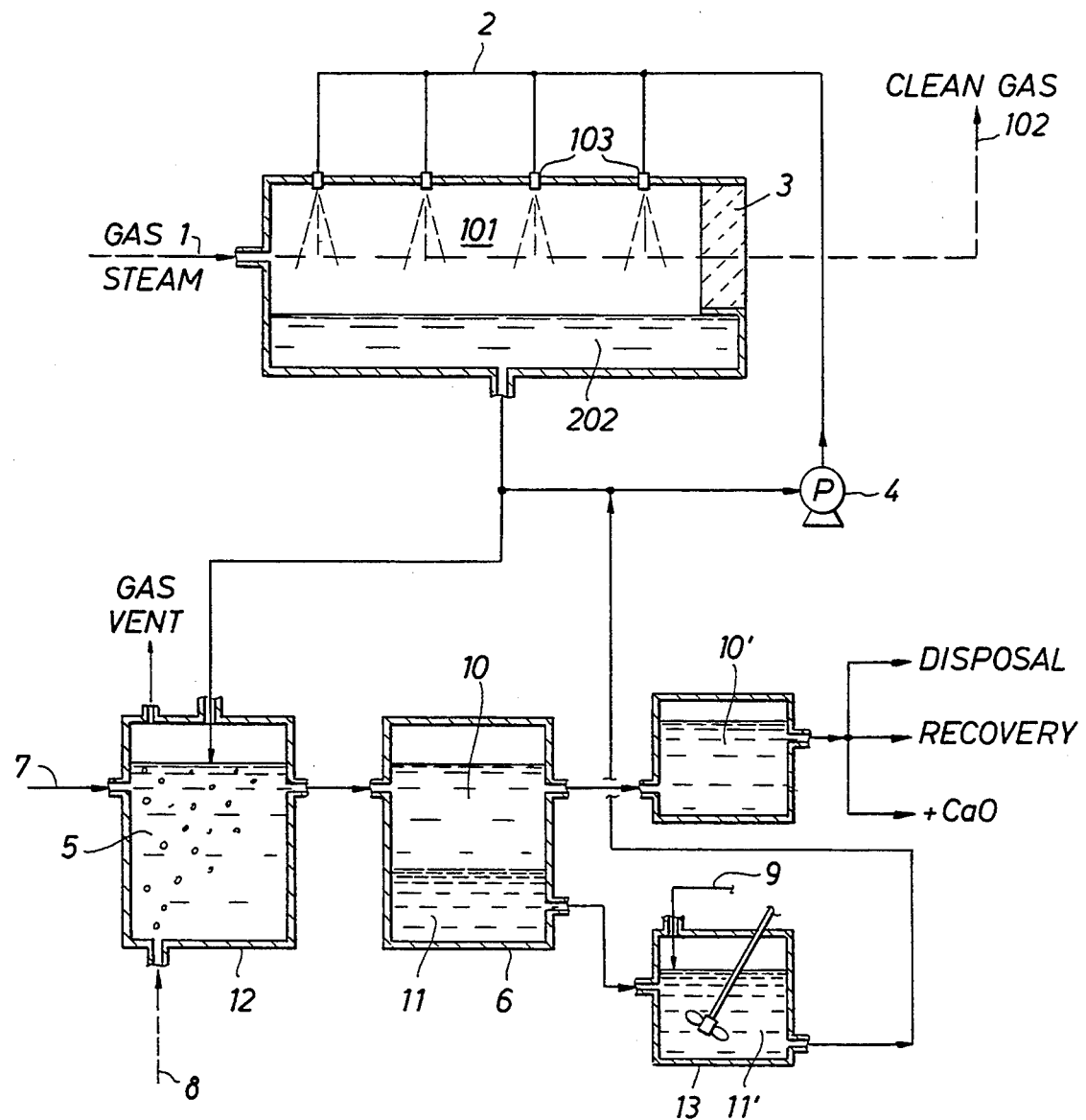

PROCESS FOR REMOVING TOTAL REDUCED SULFUR COMPOUNDS FROM GASEOUS STREAM

FIELD OF THE INVENTION

This invention relates to a process for removing sulfur compounds such as $H_2S$ and mercapatans from gaseous streams, such as those containing natural gas, industrial gas, digester gas, and the like, by oxidation with an acidic manganese-containing catalyst wherein the manganese-containing catalyst is regenerated during the process.

BACKGROUND OF THE INVENTION

Various processes have been proposed for reducing the content of sulfur compounds in gaseous streams such as those containing natural gas, industrial gases, and digester gas. Most of these processes relate to the removal of hydrogen sulfide. Because of its substantial acidic character, hydrogen sulfide is readily absorbed by alkaline absorbents. Unfortunately, the same absorbents also retain carbon dioxide, and they are not generally satisfactory for removing a number of other important industrial by-product sulfur compounds such as mercaptans, COS, and other "Total Reduced Sulfur compounds".

The term "Total Reduced Sulfur compounds" herein refers in general to sulfur compounds with the redox state of the sulfur atom at the same or a more reduced state than that of an elemental sulfur, it and includes, inter alia, $H_2S$, COS, $CS_2$, mercaptans such as methyl mercaptan, butyl mercaptan and the like, organic sulfides and disulfides such as dimethyl sulfide, dimethyl disulfide, dimethyl sulfoxide, thiophene, and similar materials including homologs of foregoing.

U.S. Pat. No. 4,822,576, issued Apr. 18, 1989, to H. H. Chu, discloses a process for removing hydrogen sulfide from a carbon dioxide containing gas mixture by solvent extraction with a tertiary amine.

U.S. Pat. No. 5,147,620, issued Sep. 15, 1992, to Linko Enterprises, discloses a process for removing hydrogen sulfide from natural gas by passing through an aqueous solution of copper (II) ions.

U.S. Pat. No. 4,880,609, issued Nov. 14, 1989, to Champion Chemicals, discloses a process for removing hydrogen sulfide from a stream of natural gas by contacting with sodium nitrite.

U.S. Pat. No. 4,892,718, issued Nov. 12, 1985, discloses a process for decontaminating COS, $CS_2$, mercaptan, $H_2S$ and $SO_x$ from gases by scrubbing using a solution of a salt of scandium, yttrium, an element of the Lanthanide or Actinium groups or blends thereof.

U.S. Pat. No. 4,824,645, issued Apr. 25, 1989, to Mobil Oil, discloses a process for removing hydrogen sulfide from a gas stream from a natural gas production well containing carbon dioxide by contacting with a polyvalent metal chelate solution such as iron-HEDTA (N-(2-hydroxyethyl)ethylenediaminetriacetic acid) solution.

Unfortunately, the chemicals used in most of the above mentioned processes have problems of being environmentally undesirable, chemically unstable or not regenerable during the process. For instance, tertiary amine itself is an odorous material and is thus environmentally undesirable. Copper is potentially toxic. Nitrite is a pollutant. The chelating agent HEDTA in an iron-HEDTA solution often decomposes during the process and replenishing the chelating agent is costly.

There is a line of patents disclosing the use of manganese dioxide for removing sulfur contaminants from gas stream. Manganese oxides are non-toxic and are extremely insoluble in water. Therefore, process utilizing manganese oxides have less environmental disposal problems than those materials used in other prior art processes.

Chinese patent application No. 1,052,260 published Jun. 19, 1991, discloses a process for treating sulfur oxides using a soft manganese ore containing about 60% $MnO_2$. The Mn(IV) is reduced to Mn(II) and $MnSO_4$ is recovered as a byproduct. The reference only discloses the removal of sulfur oxides and does not teach the removal of Total Reduced Sulfur. Moreover, no manganese regeneration is mentioned. A similar process is disclosed in Japanese patent application No. 3,207,427, published Sep. 10, 1991.

U.S. Pat. No. 4,552,735 and U.S. Pat. No. 4,552,734, both issued Nov. 12, 1985, disclose processes for removing Total Reduced Sulfur compounds from industrial gases by absorption and/or oxidation on dried manganese dioxide particles which contain an alkaline material. The spent manganese oxide particles are collected by an electrostatic precipitator or a bag filter unit or a bag-house. Since the manganese dioxide particles utilized are in dry form, these processes are less efficient than those processes utilizing aqueous slurries of manganese oxides.

U.S. Pat. No. 4,713,225, issued Dec. 15, 1987, discloses a process for removing organic reduced sulfur compounds using pre-fabricated foraminous filters containing manganese dioxide. The preparation and the regeneration of the active manganese dioxide containing filters are time consuming. Moreover, the process is a dry process and is therefore less efficient than a wet process.

U.S. Pat. No. 4,923,688, issued May 8, 1990 to J. Iannicelli, discloses a wet scrubbing process for removing Total Reduced Sulfur compounds using activated manganese dioxide absorbent particles which may contain alkaline material such as sodium hydroxide, sodium hydrogen carbonate and sodium carbonate. However, wet scrubbing processes using manganese oxides under alkaline conditions are often not efficient for the removal of certain reduced sulfur compounds. Moreover, an alkaline scrubbing solution also absorbs carbon dioxide and forms manganous carbonate precipitates which is difficult to be regenerated back to $MnO_2$, $Mn_3O_4$ and $Mn_2O_3$.

These prior art processes utilizing $MnO_2$ are not efficient and are therefore costly. Since the 1990 Amendment to the Clean Air Act requires more facilities to have air toxics control, there is a need for an improved process which can efficiently remove Total Reduced Sulfur such as $H_2S$ and mercaptans and which provides a simple and economic method for the regeneration of the chemicals used.

SUMMARY OF THE INVENTION

This invention relates to a process for removing Total Reduced Sulfur compounds from gaseous streams, such as those containing natural gas, industrial gas, anaerobic digester gas, and the like, by oxidation with a fine flocculent acidic catalyst slurry which is regenerable during the process by pH adjustment in the absence of added heat. The catalyst slurry comprises $MnO_2$, $Mn_3O_4$ and $Mn_2O_3$ having a pH in the range from about 0.5 to about 6.5 and is prepared by passing an oxygen-containing gas to a divalent manganous salt in an aqueous solution having a pH in the range from about 8.0 to about 13.5. During this process, the sulfur compounds and other oxidizable odorous pollutants in the gaseous stream are oxidized into sulfate which are soluble in water. The manganese oxides in the slurry are reduced to water soluble manganous ions which are regenerated back to a very fine flocculent catalyst slurry comprising $MnO_2$, $Mn_2O_3$, and $Mn_3O_4$ by oxidation with an oxygen-containing gas after raising the pH of the catalyst slurry to a range of 8.0 to 13.5 in the absence of added heat. The catalyst slurry comprising $MnO_2$, $Mn_2O_3$ and $Mn_3O_4$ is stable and insoluble in aqueous solution from pH 1–13 and can be separated from the aqueous sulfate and thereafter recycled back to the reaction chamber to be reused for the oxidation of the Total Reduced Sulfur compounds. The aqueous sulfate solution can either be disposed through a disposal well or be recovered.

The invention further provides a process for removing sulfur compounds from a gaseous stream by oxidation with a mixture comprising an iron salt and a fine flocculent acidic catalyst slurry comprising $MnO_2$, $Mn_2O_3$, and $Mn_3O_4$ prepared by aerating a divalent manganous salt in an aqueous solution having a pH in the range from 8.0 to 13.5.

BRIEF DESCRIPTION OF THE DRAWINGS

The appended drawing is a schematic diagram contemplating an industrial scale application of the instant process for removing Total Reduced Sulfur compounds using a regenerable manganese oxide catalyst slurry.

A detailed description of the process illustrated by the drawing can be found in the detailed description hereinafter.

Throughout the drawing, the same reference numerals have been used for similar purposes, and accessories such as valves, pumps and control instruments not necessary for the purpose of understanding of the present invention are not all shown.

DETAILED DESCRIPTION OF THE INVENTION

The present invention provides a wet scrubbing process for removing Total Reduced Sulfur compounds from a gaseous stream using an acidic slurry of manganese oxides. It further provides a simple method for the regeneration of the spent manganese oxides.

The gaseous feed to the instant process will generally be (i) natural gas, typically including $CH_4$, heavier hydrocarbons and/or carbon dioxide, (ii) industrial gas such as waste gases from pulping mills, particularly kraft mills, petroleum refineries, and other chemical manufacturing and refining installations, (iii) fuel gas such as propane and/or butane containing gas produced from oil refining process, or (iv) synthesis gas such as syngas produced by coal gasification.

Natural gas typically includes $CH_4$ and heavier hydrocarbons, e.g. up to $C_8$ series molecules. Natural gas is often produced with sulfur compounds such as $H_2S$, carbonyl sulfide, and mercaptans which must be removed immediately for a multitude of reasons. For instance, $H_2S$ causes metal embrittlement. It requires special metal alloys in the construction of gathering lines, compression stations and the like to handle natural gas with $H_2S$ and/or mercaptans. Concentrations of $H_2S$ even as small as 0.01 ppm can be detected by most people. $H_2S$ and mercaptans are toxic in relatively light concentrations. For these reasons and others, it is best removed from natural gas as soon as possible.

The term "industrial gas" as used herein, refers to gases produced as products, intermediates, or by-products in industrial processing facilities including, for example, waste gases from pulping mills, particularly kraft mills, petroleum refineries, and other chemical manufacturing and refining installations. Industrial gases often contain sulfur compounds, especially "Total Reduced Sulfur" compounds, which cause public health and environmental problems.

The term "digester gas" as used herein, refers to gases generated from anaerobic digesters in wastewater treatment plants which normally contain methane, carbon dioxide, $H_2S$, and mercaptans.

The term "Total Reduced Sulfur compounds" herein refers in general to sulfur compounds with the redox state of the sulfur atom at the same or a more reduced state than that of an elemental sulfur and includes, inter alia, $H_2S$, COS, $CS_2$, mercaptans such as methyl mercaptan, butyl mercaptan and the like, organic sulfides and disulfides such as dimethyl sulfide, dimethyl disulfide, dimethyl sulfoxide, thiophenes, and similar materials including homologs of foregoing. These Total Reduced Sulfur (TRS) compounds are typically toxic and/or odorous contaminants of various industrial gases which must be at least partially removed before releasing the gases into the environment or before the gases can be used for other purposes.

In one embodiment of the present invention, the gas mixture to be treated comprises a substantial amount of carbon dioxide, e.g., more than 10% v $CO_2$, which can be from a variety of conventional sources, including natural gas, fuel gas, synthesis gas and the like. In a specific embodiment of the present invention, the gas mixture is substantially $CO_2$, e.g., at least 80% v or especially at least 90% v $CO_2$. Such $CO_2$ gas is often produced from subterranean $CO_2$ reservoirs and, after purification and dehydration, is used as an injection fluid for secondary or tertiary oil recovery processes.

Referring to the appended drawing, the present process is typically initiated by introducing the gaseous feed 1 to the reaction chamber 101, which can be either a reactor, a column or a series of columns. The gaseous feed to the reaction chamber will ordinarily have a temperature from about 10° C. to about 200° C., preferably from about 25° C. to about 140° C., the pressure will typically be from about 0.01 psi to about 2000 psi, preferably from about 0.1 psig (pound per square inch gauge) to about 1500 psig.

A flocculent catalyst slurry 2 can be introduced to the reaction chamber through fine spray nozzles or atomizer nozzles 103. In the alternative, in a batch process, the reaction chamber can be filled with flocculent catalyst slurry and the gaseous feed is introduced to the reaction chamber via fine bubble diffusers. The flocculent catalyst slurry typically contains from about 0.01M to about 1M, preferably from about 0.05 to about 0.5M of manganese oxides, i.e. $MnO_2$, $Mn_2O_3$, and $Mn_3O_4$ and has a pH value in the range from about 0.5 to about 6.5, preferably from about 1.5 to about 5.5. This flocculent catalyst slurry is prepared by contacting, for typically 0.5 to 20 hours, preferably 1 to 10 hours, a manganous salt in an aqueous solution having a pH value from about 8.0 to about 13.5 with an oxygen-containing gaseous stream having an oxygen partial pressure in the range from about 0.1 psig to about 100 psig, preferably from about 1 psig to about 15 psig, having a total gas pressure in the range from about 1 psig to about 500 psig, preferably from about 5 psig to about 100 psig, at a temperature typically above the freezing point of the solution, i.e. in the range from about 0° C. to about 250° C. preferably from about 20° C. to about 150° C.

In a preferred embodiment of the present invention, the catalyst slurry is prepared at ambient temperature and ambient pressure by aeration for 1 to 10 hours without adding any heat or pressure. The manganese oxides formed by this method have a much greater surface area than a suspension prepared from commercial manganese dioxide and thus provide for a much higher scrubbing efficiency. An acid, such as hydrochloric acid or sulfuric acid, is added to the slurry to adjust the catalyst slurry to an acidic pH in the range from about 0.5 to about 6.5, preferably from about 1.5 to about 5.5. As a specific embodiment of the present invention, a waste acid is used to adjust the pH of the catalyst slurry. The catalyst slurry will have a temperature typically above the freezing point and below the boiling point of the solution, i.e in the range from about 0° C. to about 100° C., preferably from about 20° C. to about 95° C.

In another preferred embodiment of the present invention, a water soluble iron salt, such as ferrous sulfate, is added to the manganese oxides catalyst slurry as a homogeneous oxidizing mediator. Since Fe(III) is soluble in acidic aqueous solution, it makes better contact with sulfur contaminants in the gaseous stream than manganese oxides which are insoluble in aqueous solution. As a non-limiting illustrative example, 0.1–10 mM of ferrous sulfate ($FeSO_4$) is added to the manganese oxides slurry. Iron (II) will automatically oxidize to iron(III) in the presence of $MnO_2$, $Mn_2O_3$ and/or $Mn_3O_4$.

After reaction with the catalyst slurry, a substantial portion of the Total Reduced Sulfur compounds in the gaseous stream is oxidized to form sulfate ($SO_4^=$) ions which are dissolved in the aqueous catalyst solution while the $MnO_2$, $Mn_2O_3$ and $Mn_3O_4$ are reduced to form manganous (II) ions which are also soluble in the aqueous solution.

The treated gaseous stream having a substantial portion of the Total Reduced Sulfur compounds removed is optionally passed through a demister 3 and collected as cleaned gas 102.

The used scrubbing catalyst solution 202 containing divalent manganous sulfate or chloride ions, optionally iron (II,) is drained either continuously or intermittently to a regeneration chamber 12. The catalyst slurry is regenerated by contact with an oxygen-containing gaseous stream under alkaline conditions. It is then settled, decanted and acidified for recycling. The oxygen-containing gaseous stream is typically a gaseous stream containing from about 5% to near 100% oxygen ($O_2$). Non-limiting examples of the oxygen-containing gaseous stream include air, oxygen ($O_2$) gas with near 100% purity, and mixtures thereof. Specifically, an alkaline stream 7 is added to the spent catalyst solution 5 to adjust the pH of the solution to a value from about 8.0 to about 13.5. Non-limiting examples of the alkaline stream include an alkaline solution, caustic NaOH, caustic KOH, waste bases, waste alkaline solution, etc. The solution is thereafter contacted for typically about 0.1 to 20 hours, preferably 1 to 10 hours, with an oxygen-containing gas stream 8 having an oxygen partial pressure in the range from about 0.1 psig to about 100 psig, preferably from about 1 psig to about 15 psig, having a total gas pressure in the range from about 1 psig to about 500 psig, preferably from about 5 psig to about 100 psig. The temperature of the oxygen-containing gas stream is above the freezing point of the solution, i.e. typically in the range from about 0° C. to about 250° C., preferably from about 20° C. to about 150° C. In a preferred embodiment of the present invention, the catalyst solution is regenerated at ambient temperature and ambient pressure by aeration for about 1 to 10 hours without applying any heat or pressure. During the regeneration, the color of the solution gradually changes from light brown to dark brown and/or almost black which indicates that the manganous (II) ion is gradually changed to manganese (III, IV) oxides which are in the form of insoluble fine flocs having a high surface area and which thus provide for a much higher scrubbing efficiency. The regenerated solution is then settled in a gravity settler 6. The supernatant brine 10 containing sulfates such as $Na_2SO_4$ or $K_2SO_4$ is decanted as spent supernatant brine 10'.

The settled slurry 11 is transferred to an acidifier 13 in which an acid 9, such as hydrochloric acid or sulfuric acid, is added to the settled slurry. The pH of the settled slurry is adjusted to an acidic range from about 0.5 to about 6.5, preferably from about 1.5 to about 5.5. This catalyst slurry 11' made of manganese oxide flocs is stable and insoluble in water within the pH range from about 1 to about 13 and will typically have a temperature above the freezing point and below the boiling point of the solution, i.e. in the range from 0° C. to about 100° C., preferably from about 20° C. to about 95° C. The catalyst slurry 11' with an acidic pH will then be recycled back by a pump 4 to reaction chamber 101 to be reused.

The spent supernatant brine 10' is optionally neutralized with an acid, such as hydrochloric acid or sulfuric acid. It can be disposed to a disposal well. Alternatively, the salts in the spent supernatant brine 10' which typically comprises sodium sulfate or potassium sulfate, etc., can be recovered by concentration and/or evaporation. As another alternative, slaked lime ($Ca(OH)_2$) or lime (CaO) can be added to the spent supernatant brine 10' to generate a high pH alkaline slurry comprising NaOH or KOH and $CaSO_4$. The formation of alkaline solution by adding slaked lime or lime can be illustrated by the following equation:

$$CaO + Na_2SO_4 + H_2O \rightarrow CaSO_4 ppt + 2NaOH$$

The solid calcium sulfate precipitates are removed by filtration or precipitation, and the solution which contains sodium hydroxide can then be used for pH adjustment.

As a specific embodiment of the present invention, the acid used for adjusting the pH of the manganese oxide slurry to the range between about 0.5 to about 6.5 is a waste acid. An illustrative example of the suitable waste acids comprises an acid by-product generated from an industrial process which may contain a low concentration of acid and/or which may contain minor impurities. In another specific embodiment of the present invention, a waste base is used to adjust the spent manganese oxide-containing slurry to the range between about 8.0 to about 13.5 before it is subject to regeneration.

The invention will be illustrated by the following illustrative embodiments which are provided for illustration only and are not intended to limit the scope of the instant invention.

Illustrative Embodiments

Part A: Preparation of 0.3M manganese oxides ($MnO_2$, $Mn_2O_3$, and $Mn_3O_4$)

Slurry:
1. Add 50.7 grams of manganese sulfate ($MnSO_4 \cdot H_2O$) to 900 ml of deionized water.
2. Adjust the pH to 12.5 with concentrated NaOH solution.
3. Aerate the solution for 1–24 hours to form a slurry.
4. Acidify the slurry to pH 1–2.
5. Add sufficient deionized water to make one liter of slurry.

The oxidized slurry was dark and appeared as fine flocs of about 10–500 microns in size with high surface area under microscopic examination.

Illustrative Embodiment I

REMOVAL OF METHYL MERCAPTAN UNDER ACIDIC CONDITION

A glass column, 36" high, 2" in diameter, which corresponds to the reaction chamber 101 of the appended drawing, was initially filled with 1.5 liters of scrubbing slurry containing 0.3M of manganese oxides prepared according to Part A above. The glass column had a fine-bubble diffuser at the bottom. A gas stream containing air as the carrier gas and from about 1 to about 4 ppm by volume of methyl mercaptan was passed through the glass column at a flow rates of 1 or 2 liters per minute. The methyl mercaptan was generated from a Span-lab Model 580-3C Precision Gas Standard Generator with a permeation membrane tube filled with mercaptan liquid.

A series of tests were conducted for 406 hours under various testing conditions which include various mercaptan concentrations, gas stream flowrates, pH levels of scrubbing slurry, and gas/liquid contact times. The gas/liquid contact times are controlled by the volume of the slurry in the column. The results under different testing conditions are listed in Table 1.

The tests were initiated with the reactor column filled with 1.5 liter of manganese oxide slurry with pH adjusted to 1.67, flow rate of 1.00 liters per minute and methyl mercaptan level of 1.31 ppm by volume. Gas samples of both feed and treated gas were collected in Tedlar bags and analyzed immediately with a Photovac 10S50 gas chromatograph having a photoionization detector (GC/PID).

As shown in Table 1, with a very acidic manganese oxide slurry, no detectable mercaptan was found in the gas samples collected from the exit of the glass column both after 1 hour and after 24 hours. Doubling the gas flow rate to 2 liters per minute did not produce any detectable mercaptan in the exit gas stream.

The minimum retention time required for a higher than 95% mercaptan removal rate was also determined from the tests. When the volume of the manganese oxide slurry in the scrubber column was gradually reduced from 1.5 liter to 0.38 liter, nearly complete mercaptan removal was maintained. Further reduction of the slurry volume resulted in a significant loss in the efficiency for mercaptan removal. When the volume was reduced to 0.19 liter after 69 hours of testing, the mercaptan removal rate dropped to 90.07%.

The effect of the pH of the manganese oxide slurry in the scrubber column on the efficiency of the mercaptan removal was also examined. When the pH of the slurry was increased from 1.8 to 7.3, the mercaptan removal rate dropped from 100% to about 80%, as shown in the test results after 93 hours and 98 hours. In order to compensate for the loss in oxidizing power from the increase in the pH level of the slurry, an increase in gas/liquid contact time was needed to regain the removal efficiency. This was shown when the flow rate was reduced from 2 liters per minute to 1 liter per minute at 176 hour run, the removal rate increased from about 80% back to 95%. When the pH of the slurry was gradually decreased, a corresponding increase in the removal efficiency was again observed from run hours 176 to 406.

Illustrative Embodiment II

REMOVAL OF METHYL MERCAPTAN UNDER ACIDIC AND ALKALINE CONDITION

The reaction was carried out in the same fashion as that in the Illustrative Embodiment I above, except that the reaction was initially conducted under alkaline condition. At the start of the reaction, the reactor contained 1.5 liter of 0.3M manganese oxides slurry prepared according to Part A above except the pH is adjust to 9.12. The flow rate was maintained at 1 liter per minute throughout the 345 hours test period. As shown in TABLE 1, the rate of mercaptan removal was only about 40% when the pH of the slurry was 9.37 at the end of 121 hour. When the pH was adjusted to 4.67 at the end of 316 hour, the removal rate was as high as 100%.

The liquid samples were taken from the scrubbing slurry in the test column after the test was terminated and were analyzed for sulfur ingredients using HPLC. The results showed that all the sulfur compounds present in the liquid samples were sulfates ($SO_4^=$).

TABLE 1

Removal of Methyl Mercaptan by $MnO_2$ Slurry.

| Cumm Time (hours) | pH | Flow (L/min) | Mercaptan (ppmv) Feed | Mercaptan (ppmv) Exit | Removal (%) | Note |
|---|---|---|---|---|---|---|
| Illustrative Embodiment I ||||||||
| 1 | 1.67 | 1.00 | 1.31 | 0.000 | 100.00 | Vol = 1.50 L |
| 24 | 1.74 | 2.00 | 1.39 | 0.000 | 100.00 | |
| 44 | 1.76 | 2.00 | 1.33 | 0.000 | 100.00 | Vol = 0.75 L |
| 49 | 1.76 | 2.00 | 1.30 | 0.005 | 99.62 | Vol = 0.38 L |
| 69 | 1.76 | 2.00 | 1.29 | 0.120 | 90.70 | Vol = 0.19 L |
| 93 | 7.28 | 2.00 | 1.40 | 0.240 | 82.86 | Vol = 0.75 L, pH adj. |
| 98 | 4.73 | 2.00 | 1.31 | 0.250 | 80.92 | |
| 176 | 5.50 | 1.00 | 1.37 | 0.060 | 95.62 | Flowrate adj. to 1.0 |
| 182 | 5.78 | 2.00 | 1.37 | 0.240 | 82.48 | Flowrate adj. to 2.0 |
| 200 | 3.89 | 2.00 | 1.21 | 0.018 | 98.51 | pH adj. |
| 222 | 3.90 | 2.00 | 1.27 | 0.031 | 97.56 | |
| 247 | 1.81 | 2.00 | 1.26 | 0.017 | 98.65 | pH adj. |
| 252 | 1.81 | 2.00 | 1.20 | 0.022 | 98.17 | |
| 255 | 1.81 | 2.00 | 4.17 | 0.080 | 98.08 | Feed Conc adj. |
| 271 | 1.80 | 2.00 | 4.26 | 0.200 | 95.31 | Vol = 0.35 L (added to 0.75) |
| 295 | 1.80 | 2.00 | 4.51 | 0.151 | 96.65 | Flowrate adj. to 1.0 |
| 335 | 1.83 | 1.00 | 3.91 | 0.003 | 99.92 | |
| 358 | 1.82 | 1.00 | 3.90 | 0.006 | 99.85 | |
| 406 | 1.83 | 1.00 | 3.92 | 0.040 | 98.98 | (vol = 0.49 L) |
| Illustrative Embodiment II ||||||||
| 2 | 9.12 | 1.00 | 3.95 | 0.787 | 80.08 | Vol = 0.75 L |
| 20 | 9.38 | 1.00 | 3.87 | 0.522 | 86.51 | pH adj from 8.92 |
| 46 | 9.44 | 1.00 | 3.91 | 0.834 | 78.67 | |

TABLE 1-continued

Removal of Methyl Mercaptan by MnO₂ Slurry.

| Cumm Time (hours) | pH | Flow (L/min) | Mercaptan (ppmv) Feed | Mercaptan (ppmv) Exit | Removal (%) | Note |
|---|---|---|---|---|---|---|
| 75 | 9.69 | 1.00 | 3.86 | 0.957 | 75.21 | |
| 93 | 9.75 | 1.00 | 4.06 | 1.436 | 64.63 | pH adj from 9.00 |
| 121 | 9.37 | 1.00 | 4.11 | 2.453 | 40.32 | |
| 126 | 8.47 | 1.00 | 4.00 | 2.029 | 49.28 | RXN restarted after 2 days |
| 144 | 6.58 | 1.00 | 4.03 | 1.796 | 55.43 | |
| 168 | 6.56 | 1.00 | 4.09 | 1.808 | 55.79 | |
| 220 | 6.49 | 1.00 | 4.15 | 1.820 | 56.14 | |
| 316 | 4.67 | 1.00 | 4.03 | 0.000 | 100.00 | pH adj from 6.13 |
| 345 | 5.44 | 1.00 | 3.98 | 0.068 | 98.29 | |

Illustrative Embodiment III

REGENERATION OF MANGANESE OXIDES

Spent manganese solution from Illustrative Embodiment I is drained to a regeneration container which corresponds to the regeneration chamber 12 in the appended drawing. To one liter of said spent catalyst solution from Illustrative Embodiment I which is a 0.3M manganese solution containing Mn(II) with pH 1.83, sufficient amount of NaOH is gradually added with rapid mixing to adjust the pH to about 12.5, followed by aeration for 12 hours. During regeneration by air sparging, the color of the high pH slurry (pH 12-13) gradually changes from light brown to almost black which indicates that the manganous (II) hydroxide gradually changes to manganese oxides (III & IV). The regenerated slurry 11 is settled and approximately 0.5 liter clear supernatant is decanted. Water and sulfuric acid is then added to the settled slurry to bring the pH down to 1.7 and the volume down to one liter. The acidified regenerated manganese oxides slurry 11 is then ready to be reused for scrubbing mercaptan-containing gas stream.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

We claim:

1. A process for the removal of Total Reduced Sulfur compounds from a gas stream, which process comprises:

contacting said gas stream in a reaction chamber with an aqueous slurry comprising flocculent precipitates of $MnO_2$, $Mn_2O_3$, $Mn_3O_4$ and iron salt, and said slurry having a pH value in the range of from about 0.5 to about 6.5, thereby forming (a) a spent solution comprising sulfate and manganous (II) ions and (b) a purified gas stream having diminished amounts of Total Reduced Sulfur compounds over that in the gas stream;

wherein said aqueous slurry comprises from about 0.01M to about 1M of manganese oxides and from 0.1 to about 10 mM of iron;

wherein said slurry is prepared by contacting a manganous salt, dissolved in an aqueous solution having a pH value from about 8.0 to about 13.5, with an oxygen-containing gaseous stream, thereby forming flocculent precipitates of $MnO_2$, $Mn_2O_3$ and $Mn_3O_4$, followed by adjusting the pH to said range of from about 0.5 to about 6.5 and subsequently adding an iron salt.

2. The process of claim 1, wherein the spent solution is regenerated by (a) adjusting the pH of said spent solution to a range between about 8.0 and about 13.5;

(b) passing an oxygen-containing gas stream therethrough to form flocculent precipitates of $MnO_2$, $Mn_2O_3$, $Mn_2O_4$ and Fe (III);

(c) phase separating said regenerated flocculent precipitates, produced from step (b) above, from the remaining solution;

(d) adjusting the pH of said separated flocculent precipitates by the addition of an acid to bring the pH to within a range of from about 0.5 to about 6.5; and (e) recycling at least a part of the product of (d) above to the reaction chamber.

3. A process for the removal of Total Reduced Sulfur compounds from a waste gas stream selected from the group consisting of an industrial gas and anaerobic digester gas, which process comprises:

(i) contacting said waste gas stream in a reaction chamber with an aqueous slurry comprising flocculent precipitates of $MnO_2$, $Mn_2O_3$, $Mn_3O_4$ and Fe (III), wherein said aqueous slurry comprises from about 0.01M to about 1M of manganese oxides and from 0.1 to about 10 mM of iron;

wherein said slurry has a pH value from about 1.5 to about 5.5 and has a temperature in a range from about 20° C. to about 95° C., wherein the pressure of the waste gas stream is from about 0.1 psig to about 1500 psig, wherein the temperature of the waste gas stream is in a range from about 10° C. to about 140° C., thereby forming (a) a spent solution comprising $SO_4^=$ and manganous (II) ion and (b) a purified gas stream having diminished amounts of Total Reduced Sulfur compounds over that in the waste gas stream;

wherein said slurry comprising flocculent precipitates of $MnO_2$, $Mn_2O_3$, $Mn_3O_4$ and Fe(III) are prepared by passing an oxygen-containing gaseous stream through a manganous salt-containing aqueous solution having a pH value from about 9.5 to about 12.5 in the absence of added heat, maintaining the temperature of the aqueous solution at from about 20° C. to about 150° C., maintaining the oxygen partial pressure of the oxygen-containing gaseous stream at from about 1 to about 15 psig and maintaining total gas pressure of the oxygen-containing gaseous stream at from about 5 psig to about 100 psig, thereby forming a slurry comprising flocculent precipitates of $MnO_2$, $Mn_2O_3$, and $Mn_3O_4$ followed by (a) adjusting the pH to of the slurry to a range from about 1.5 to about 5.5 and (b) adding iron containing salt to the slurry; and (ii) regenerating said spent solution by:

(a) adjusting the pH of said spent solution to a range between about 9.5 and 12.5

(b) passing an oxygen-containing gaseous stream through the solution from step (a) in the absence of added heat, maintaining the temperature of the solution at from about 20° C. to about 150°

C., maintaining the oxygen partial pressure of the oxygen-containing gaseous stream at from about 1 to about 15 psig and maintaining the total gas pressure thereof at from about 5 psig to about 100 psig, to produce a mixture comprising (a) regenerated flocculent precipitates comprising $MnO_2$, $Mn_2O_3$, $Mn_3O_4$, Fe(III) and (b) remaining spent solution comprising $SO_4^=$;

(c) phase separating said regenerated fine flocculent precipitates produced from step (b) above, from the remaining spent solution;

(d) adjusting the pH of said separated regenerated fine flocculent precipitates from (c) by the addition of an acid to bring the pH to within a range between about 1.5 and about 5.5; and (iii) recycling the product of (d) to the reaction chamber.

4. The process as described in claim 3, wherein the remaining spent solution from (ii)(c) is sent to a disposal well.

5. The process as described in claim 3, wherein salts of the sulfate in the remaining spent solution from (ii)(c) are recovered.

6. The process as described in claim 3, wherein CaO or Ca(OH)2 is added to the remaining spent solution to form a caustic solution comprising $OH^-$.

7. The process as described in claim 6, wherein at least a part of the caustic solution comprising $OH^-$ is used for pH adjustment in step (i) and/or step (ii)(a).

8. A process for the removal of Total Reduced Sulfur compounds from a natural gas, which process comprises:

(i) contacting said natural gas in a reaction chamber with an aqueous slurry comprising flocculent precipitates of $MnO_2$, $Mn_2O_3$, $Mn_3O_4$, and Fe(III), wherein said aqueous slurry comprises from about 0.01M to about 1M of manganese oxides and from 0.1 to about 10 mM of iron;

wherein said slurry has a pH value from about 1.5 to about 5.5 and has a temperature in a range from about 20° C. to about 95° C., wherein the pressure of the natural gas is from about 0.1 psig to about 2000 psig, thereby forming (a) a spent solution comprising $SO_4^=$ and manganous (II) ion and (b) a purified gas stream having diminished amounts of Total Reduced Sulfur over that in the natural gas;

wherein said slurry comprising flocculent precipitates of $MnO_2$, $Mn_2O_3$, $Mn_3O_4$ and Fe are prepared by oxygen-containing gaseous stream through a manganous salt containing an aqueous solution having a pH value from about 9.5 to about 12.5 in the absence of added heat, maintaining the temperature of the aqueous solution at from about 20° C. to about 150° C., maintaining the oxygen partial pressure of the oxygen-containing gaseous stream at from about 1 to about 15 psig and maintaining the total gas pressure of the oxygen-containing gaseous stream at from about 5 psig to about 100 psig, thereby forming a slurry comprising flocculent precipitates of $MnO_2$, $Mn_2O_3$, and $Mn_3O_4$ followed by (a) adjusting the pH to of the slurry to a range from about 1.5 to about 5.5 and (b) adding iron containing salt to the slurry; and (ii) regenerating said spent solution by:

(a) adjusting the pH of said spent solution to a range between about 9.5 and 12.5

(b) passing an oxygen-containing gaseous stream through the solution from step (a) in the absence of added heat, maintaining the temperature of the solution at from about 20° C. to about 150° C., maintaining the oxygen partial pressure of the oxygen-containing gaseous stream at from about 1 to about 15 psig and maintaining the total gas pressure thereof at from about 5 psig to about 100 psig, to produce a mixture comprising (a) regenerated flocculent precipitates comprising $MnO_2$, $Mn_2O_3$, $Mn_3O_4$, and Fe(III) and (b) remaining spent solution;

(c) phase separating said regenerated fine flocculent precipitates produced from step (b) above, from the remaining spent solution;

(d) adjusting the pH of said separated regenerated fine flocculent precipitates from (c) by the addition of an acid to bring the pH to within a range between about 1.5 and about 5.5; and (iii) recycle the product of (d) to the reaction chamber.

* * * * *